April 8, 1941. J. F. OLIN 2,237,626
PURIFICATION OF CRUDE ESTERIFICATION MIXTURES
Filed Nov. 15, 1938
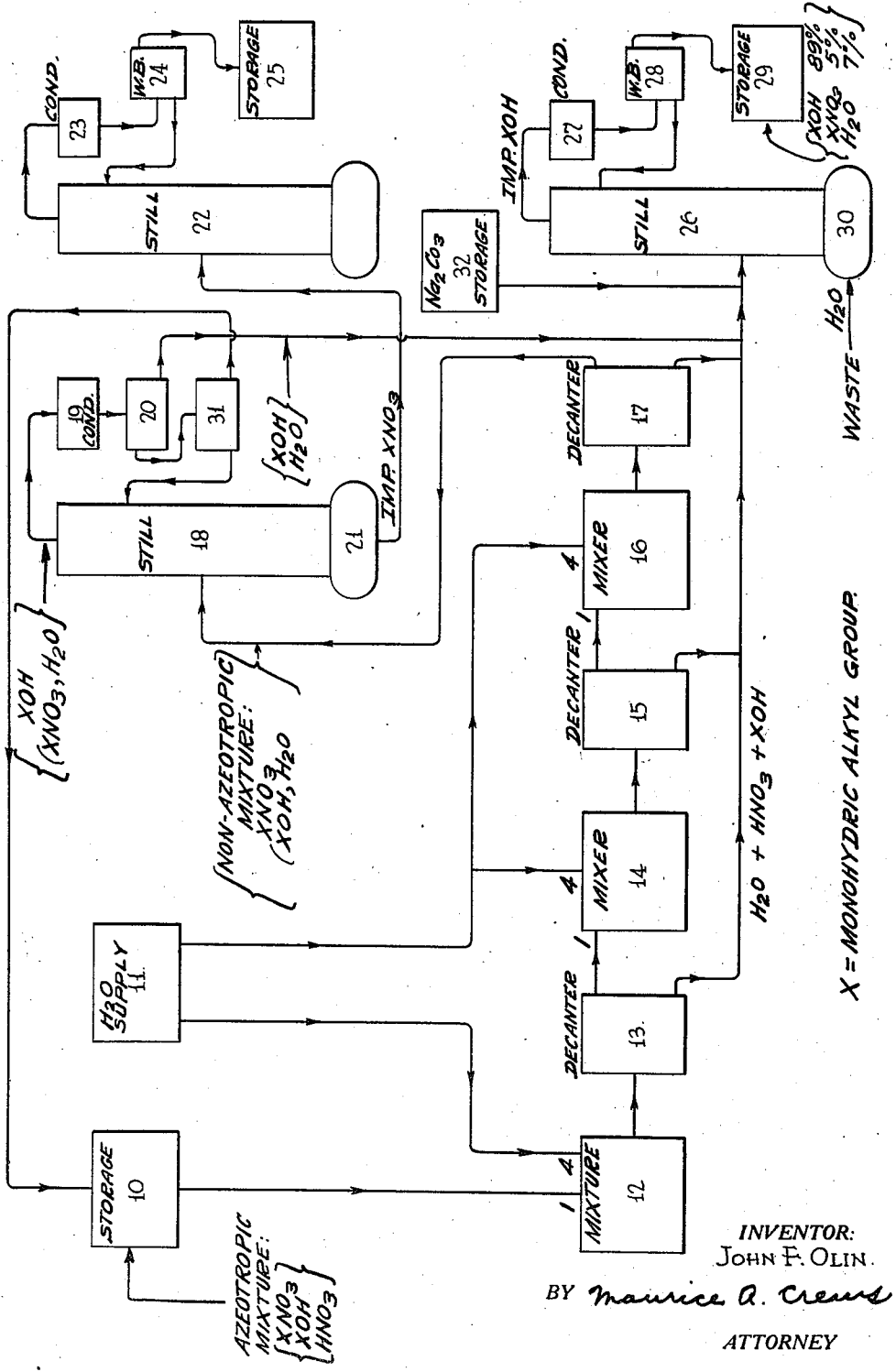
INVENTOR:
JOHN F. OLIN.
BY Maurice A. Crews
ATTORNEY Patented Apr. 8, 1941

2,237,626

UNITED STATES PATENT OFFICE 2,237,626

PURIFICATION OF CRUDE ESTERIFICATION MIXTURES

John F. Olin, Grosse Ile, Mich., assignor to The Sharples Solvents Corporation, Philadelphia, Pa.

Application November 15, 1938, Serial No. 240,514

4 Claims. (Cl. 202—60)

The present invention pertains to the separation of impurities from crude esters of nitric acid. It was conceived as a solution of problems encountered in the practice of the process described in the application of John F. Olin, Frederick P. Fritsch and Joseph J. Schaefer, Serial No. 225,908, filed August 20, 1938, for Manufacture of nitric acid esters, and can best be understood by consideration of the problems encountered in attempts to concentrate the crude esterification mixtures obtained in the practice of the process of that application.

In the process of application Serial No. 225,908, the alcohol, acid and urea are continuously passed to an esterification vessel, and partial esterification takes place in that vessel, together with passage overhead of an azeotropic mixture of the desired ester together with alcohol, water and nitric acid. This azeotropic mixture is passed through a condenser and from that condenser to a decanter. Division of the overhead fraction from the esterification still takes place in the decanter, and an oil layer containing the desired ester contaminated with varying quantities of alcohol, water and acid separates as the lighter layer in the decanter, while the alcohol is the heavier layer.

In the case of esterification to produce ethyl nitrate, only small quantities of ethyl alcohol remain in the oil layer, constituting the crude ester obtained in the decanter, since ethyl alcohol is substantially soluble both in water and in aqueous nitric acid, and therefore has an affinity for the water phase in the decanter. This is not the case, however, in esterification to produce amyl nitrate, since amyl alcohol is much more soluble in amyl nitrate than in the aqueous phase separating as the heavy layer in the decanter.

As an example of the nature of the problem solved, it may be pointed out that, in a typical operation, an esterification mixture containing only 66% of amyl nitrate may be economically treated to separate a commercially satisfactory amyl nitrate in the practice of the invention.

The object of the present invention has been to obviate these difficulties and to provide a process by which mixtures of esters of nitric acid with the esterifying alcohol may be thoroughly and economically separated into their respective constituents.

The manner in which the objects of the invention has been attained will be evident from consideration of the following description in the light of the attached drawing, in which the single figure is a flow sheet illustrating the practice of the process of the invention. While the invention is applicable to the separation of various mixtures of alcohols and esters into their respective constituents, it can best be understood by reference to the separation of the constituents of a particular mixture.

A mixture of amyl nitrate and amyl alcohol formed by the action of 45% nitric acid upon the commercial mixture of amyl alcohols sold under the trade name of Pentasol, possessing a specific gravity of 0.910 and an approximate amyl nitrate concentration of 55%, is passed to the storage vessel 10. This crude ester mixture is fed continuously into a mixer 12, and water is simultaneously fed to this mixer 12 from container 11 at approximately four times the rate of passage of the crude ester to the mixer 12. The mixer 12 is provided with an agitator for thoroughly mixing the water with the crude ester, and the mixture produced in mixer 12 is passed to decanter 13.

Water containing dissolved amyl alcohol and very small quantities of amyl nitrate is removed as the heavier phase from the decanter 13 and the oil phase containing the amyl nitrate is passed to a second mixer 14, where it is again mixed with four times its volume of water, continuously supplied from tank 11. The mixture from mixer 14 is continuously passed to decanter 15, where an aqueous layer consisting of amyl alcohol, water and a small amount of amyl nitrate is again removed, and the oil layer is passed to a third mixer 16, where it is again mixed with approximately four times its volume of water. The aqueous phase of the mixture produced in mixer 16 is separated as the heavy phase from decanter 17, and the oil phase, containing amyl nitrate, a small amount of amyl alcohol and a small amount of water, is passed to column 18.

The column 18 is maintained at a temperature sufficient to pass overhead a mixture rich in amyl alcohol and containing amyl nitrate and some water, and it is preferably operated under subatmospheric pressure in order to avoid decomposition of the amyl nitrate. The mixture is condensed in condenser 19 and passed to decanter 20. The upper phase from decanter 20, consisting of amyl alcohol contaminated with amyl nitrate and a little water, is continuously passed to a weir box 31 and part of it is thence passed to the crude ester container 10, the balance being refluxed to column 18. The lower phase from decanter 20 is sent to column 26 for stripping to separate its organic content from water. The higher boiling components of the mixture passed to column 18 accumulate in the still 21 and are pumped into column 22. This column is operated under a pressure sufficiently low and a temperature sufficiently high to cause amyl nitrate to be passed overhead, and this overhead fraction is condensed in condenser 23, and passed thence to weir box 24, from which a part is refluxed to column 22, while the remainder passes to receiver 25. The amyl nitrate so passed to receiver 25 is of approximately 98% purity and has a specific gravity of 0.989.

The aqueous layers from decanters 13, 15, 17 and 20 are combined and passed to a column 26, after addition of small quantities of sodium carbonate from container 32 to neutralize the small quantity of free acid contained in these fractions. A mixture rich in amyl alcohol and water and containing but small quantities of amyl nitrate is passed overhead from column 26. This mixture is condensed in condenser 27 and subjected to decantation in decanter 28. The oil (upper) layer, containing 88% amyl alcohol, 5% amyl nitrate and 7% water, is passed to receiver 29, where it may be held for subsequent esterification with further quantities of nitric acid of between 40% and 50% concentration. The water (lower) layer, from decanter 28 is continuously refluxed to column 26 and is ultimately stripped of organic material. Water, collecting in pot 30, is discarded.

While the invention has been described above with special reference to an esterification mixture obtained by azeotropic esterification of amyl alcohol, it is to be understood that the principles of the invention are applicable to the separation of mixtures of alcohols and nitric acid esters of aliphatic hydrocarbon compounds generally, no matter how these mixtures are produced.

In the above description, the invention has been discussed in connection with the use of water as the extracting solvent. It is to be understood that the invention is not limited to the use of pure water, since any substance having selective solvent action upon the alcohol content of the esterification mixture and capable of being removed from that mixture by decantation may be substituted for water in the practice of the invention. Thus, for example, dilute nitric acid or sulfuric acid of varying concentrations may be used as the extraction solvent in the washing operations performed in mixers 12, 14 and 16, instead of water.

Modifications will be obvious to those skilled in the art and I do not wish to be limited except by the scope of the sub-joined claims.

I claim:

1. A process of obtaining a purified nitric acid ester from a crude esterification mixture obtained by esterifying nitric acid with a monohydric alcohol which is substantially soluble in said ester, and which contains said ester, said alcohol, water and at least a small amount of nitric acid, said process comprising mixing with said ester a quantity of water which is substantially greater than the quantity of said mixture under treatment, stratifying the resulting mixture of said crude esterification mixture and added water to obtain a lighter stratum containing water, alcohol, and a higher proportion of ester than said original mixture, and a heavier stratum containing water, alcohol and a smaller proportion of ester than said original mixture, separating said strata from each other, and thereafter separately distilling the materials of said separated lighter stratum to recover purified nitric acid ester therefrom.

2. A process of obtaining a purified nitric acid ester from a crude esterification mixture obtained by esterifying nitric acid with a monohydric alcohol which is substantially soluble in said ester, and which contains said ester, said alcohol, water and at least a small amount of nitric acid, said process comprising mixing with said ester a quantity of water which is substantially greater than the quantity of said mixture under treatment, stratifying the resulting mixture of said crude esterification mixture and water to obtain a lighter stratum containing water, alcohol, and a higher proportion of ester than said original mixture, and thereafter distilling the materials of said lighter stratum to recover purified nitric acid ester therefrom.

3. A process as defined in claim 2, in which the step of distillation is accomplished under subatmospheric pressure.

4. A process as defined in claim 2, in which the distillation step is accomplished by passing overhead a mixture containing the alcohol, water and the nitric acid ester, stratifying this overhead fraction to separate an aqueous phase from a phase rich in the organic constituents, and thereafter returning material from said phase containing the organic constituents to said distillation operation as reflux.

JOHN F. OLIN.